Feb. 14, 1939.  A. W. TONDREAU  2,147,068
COLOR PHOTOGRAPHY
Filed March 20, 1937  2 Sheets-Sheet 1

INVENTOR
ALBERT W. TONDREAU
BY
W. L. Beatty
ATTORNEY

Feb. 14, 1939.  A. W. TONDREAU  2,147,068
COLOR PHOTOGRAPHY
Filed March 20, 1937  2 Sheets-Sheet 2
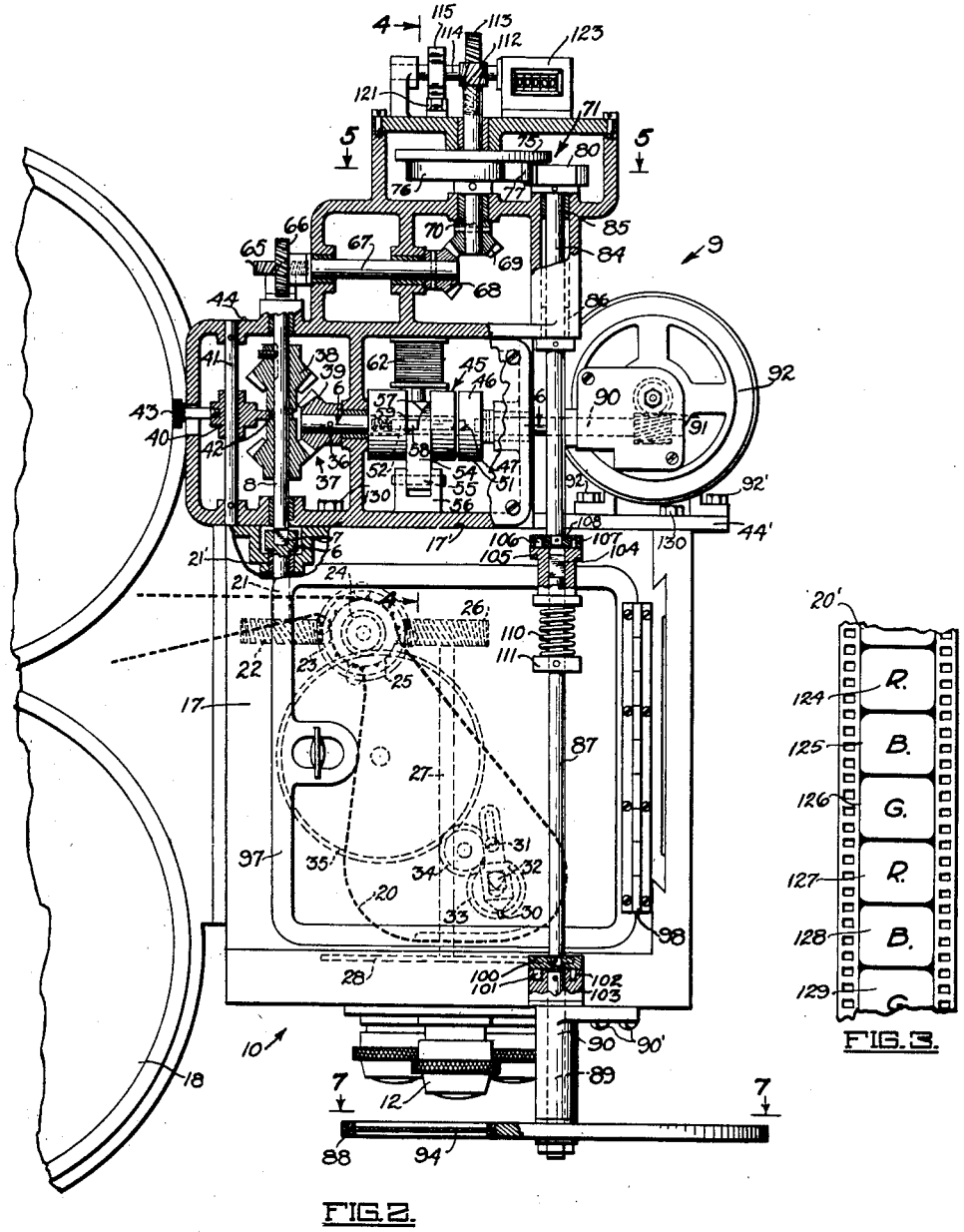
INVENTOR
ALBERT W. TONDREAU
BY
W. E. Beatty
ATTORNEY Patented Feb. 14, 1939

2,147,068

UNITED STATES PATENT OFFICE 2,147,068

COLOR PHOTOGRAPHY

Albert W. Tondreau, Glendale, Calif., assignor to Warner Bros. Pictures, Inc., New York, N. Y., a corporation of Delaware Application March 20, 1937, Serial No. 132,108

16 Claims. (Cl. 88—16.4)

My invention relates to color photography and has particular reference to the production of colored cinematographic animated cartoon films and the like.

The invention is particularly applicable to that type of color photography wherein each kinematic phase of action of an animated scene is photographed on each of several successive frames of a motion picture film but wherein those successive frames have been exposed through differently colored filters so as to obtain different color aspect records of each phase of action.

In photographing through color filters it has been found that the use of glass bases for such filters changes the optical paths of rays from the scene being photographed to the camera due to the index of refraction of the glass and the necessary thickness thereof. This is considerably pronounced in animated cartoon photography where the cartoon drawings are held only a short distance from the camera lens. It has therefore become common practice to employ very thin sheets of celluloid or gelatine as bases for such filters. However, such thin sheets, particularly gelatine, have a tendency to curl slightly or produce a wavy surface while in use due to temperature changes, humidity, etc. This wavy or aplanar surface produces a negligible amount of uneven refraction of the image when photographed therethrough with the filter held stationary during exposure, especially if the filter is held close to the camera lens. However, when the filter is continuously moved in a plane passing through the surface thereof during exposure therethrough, a continual change of the slight amount of distortion or unequal refraction of light caused by such a wavy surface moving across the path of the light rays causes the image of the film to be blurred and lose its detail.

An object of my invention is to overcome the above difficulties. This is accomplished by holding each successive filter stationary during each successive film exposure. For this purpose I employ an intermittently operating mechanism for moving the various successive filters step by step into position before the camera lens, this mechanism being operated in synchronism with the camera operating mechanism. Also a stop mechanism is employed to automatically render the camera mechanism inoperative after making the desired number of color exposures; viz, two for two color, or three for three color.

To permit reduction of vibration due to inertia and momentum of the various parts of the color wheel assembly, the filter wheel is made as small in diameter as possible, thus necessitating positioning of the filter wheel actuating shaft closely adjacent the body of the camera and in the path of the film threading door in the camera. The apparatus comprising the invention permits such positioning of the filter shaft by providing a quickly removable filter shaft section to permit opening of the camera door for threading and inspection purposes.

Preferably the mechanism for operating the color filter is embodied in an attachment which is adapted to be attached to a standard motion picture camera of a type ordinarily used for photographing black and white photographs.

More particularly describing the invention, reference is had to the accompanying drawings wherein:

Fig. 2 is an elevational view, partly in section, of a cinematographic camera and combined stop motion and color attachment therefor embodying the present invention.

Fig. 3 shows a portion of a cinematographic film as produced by my improved apparatus.

According to the usual practice in producing animated cartoon cinematographic films, a series of drawings showing successive phases of movement of objects to be animated is made by an artist. These various drawings are then photographed in succession upon successive frames of a cinematographic film. A positive print of such film, when projected in the usual cinematographic manner, will show animation or apparent movement of these objects.

Figure 1:
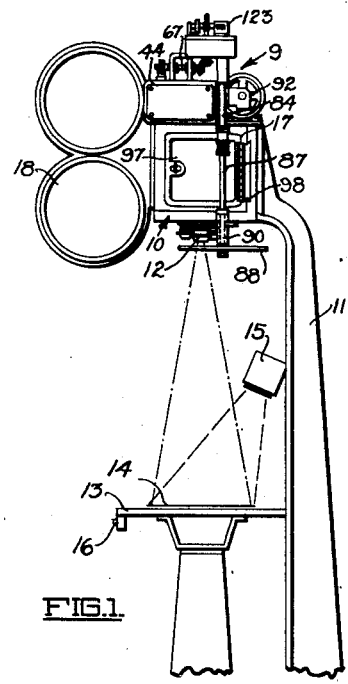
Fig. 1 is an elevational view of an apparatus embodying the present invention for producing colored animated cartoon cinematographic films.

An apparatus for producing the above type of film, and embodying the present invention, is illustrated in Fig. 1 wherein a standard Bell and Howell motion picture camera 10 is supported in a vertically disposed position upon a frame 11. The objective lens 12 of camera 10 is focused upon the upper surface of an animator's table 13. Each of a series of cartoon drawings, as diagrammatically illustrated at 14, is placed upon the table 13, suitable registering means (not shown) being employed to insure correct alignment thereof. Lamps 15 are employed to illuminate the surface of the cartoon drawings 14. I provide the standard camera 10 with an attachment 9 to adapt it to make photographs in color—preferably three color. A push button 16 is provided on the table 13. Upon operation of this push button by the camera operator, the mechanism in attachment 9 operates so that three successive frames of a motion picture film in standard camera 10 are exposed through three successive filters of different color absorption values in a manner which will be described hereinafter.

Referring to Fig. 2 the attachment 9 comprises a housing 44 and all mechanism above the upper surface 17' of the camera casing 17, including vertically extending shafts 8 and 84. Also included in the attachment 9 is a bearing 90, a removable shaft section 87, a second shaft section 89 rotatably carried in bearing 90 and a color filter wheel 88. The camera motor (not shown) which is usually directly coupled to the upper end portion of the camera drive shaft 21 for normal black and white cinematographic operation has been removed to permit the lower surface of housing 44 and a co-extensive plate 44' to lay flush with the upper surface 17' of camera casing 17. The attachment 9 is removably secured to the camera by bolts 130, securing the lower wall section of housing 44 to the upper wall of the camera casing 17, and bolts 90', securing the bearing 90 to the lower wall of casing 17.

A motor 92, also forming part of attachment 9 is carried thereby to transmit rotation to both the camera drive shaft 21 and the color filter wheel 38.

The camera 10 may be of any suitable type employed for photographing on motion picture films and in the illustration comprises a camera casing 17 having attached thereto a magazine 18 to house supply and take-up reels for a motion picture film 20. A vertically extending camera drive shaft 21 journaled in a bearing 21' is provided to drive the various film feeding and exposure controlling mechanisms in the camera. A helical gear 22, provided on the lower end of shaft 21, meshes with a second helical gear 23 at right angles thereto, the shaft of which carries a spur gear 24 and a combination film pull-down and take-up sprocket 25. Gear 23 in turn drives a third helical gear 26 secured to a vertically extending shutter shaft 27 having at the lower end thereof a shutter diagrammatically indicated at 28. An intermittent film advancing mechanism is provided, comprising a film engaging claw 30 adapted to slide and oscillate about a point 31. Claw 30 has a rectilinear opening therein, the sides of which are engaged by a three point cam 32 for the purpose of intermittently engaging the claw 30 with the film 20 to advance the same past the objective lens 12, one frame at a time. Cam 32 is rotated by a gear 33 which is operatively connected through a pair of idler gears 34 and 35 to the gear 24.

Camera shaft 21 has a socket 6 formed at the upper end thereof which receives, in driving engagement, a square shank portion 7 of a co-axial shaft 8. Socket 6 and shank portion 7 form a breakable coupling whereby the color attachment may be removed from the camera. Socket 6 is also adapted to receive the square shank portion of a camera motor shaft (not shown) in the event that the camera 10 is operated in the normal non-color condition. Shaft 8 is driven by a horizontal shaft 36 through a reversible gear connection generally indicated at 37. A combination bevel gear 38 is slidably keyed to shaft 8 and has provided thereon a pair of spaced sets of bevel gear teeth either of which is adapted to be selectively engaged with a bevel gear 39 secured to the forward end of shaft 36. A shifting member 40, slidable upon a vertically extending rod 41 has a yoked forward end portion thereof engaging a groove 42 formed on the gear 38 intermediate the opposed sets of gear teeth. A knob 43 secured to the shifting member 40 extends exteriorly of the mechanism housing 44 to permit shifting of the combination gear 38 to allow either set of the opposed bevel gear teeth on member 38 to mesh with gear 39. Shaft 36 is adapted to be driven by a continuously rotating, coaxial shaft 90 through a stop motion clutch generally indicated at 45. Shaft 90 is driven through a gear connection 91 by an electric motor 92. Motor 92 is secured by bolts 92' to a plate 44' forming part of the mechanism housing 44. Housing 44 and plate 44' are removably secured as by bolts 130 to the upper surface of the camera casing 17.

Figure 4:
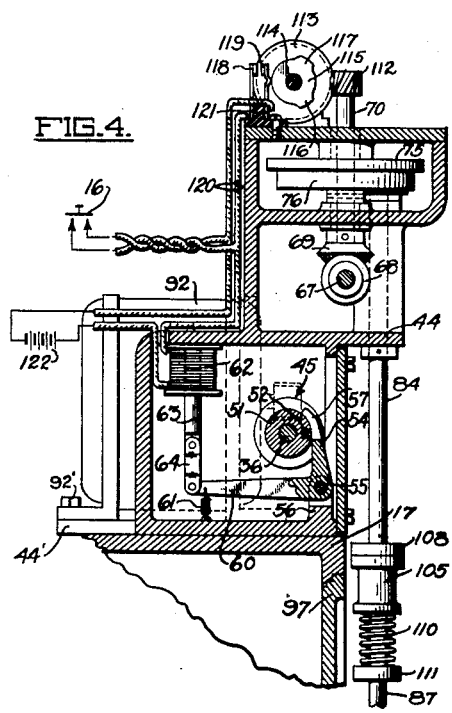
Fig. 4 is a sectional, elevation view through the combined stop motion and color attachment and is taken along the line 4—4 of Fig. 2.
Figure 6:
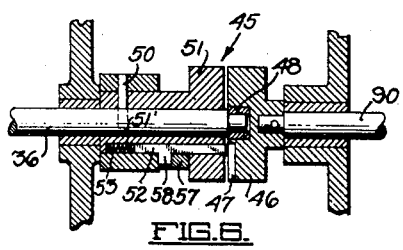
Fig. 6 is a sectional plan view of the stop motion clutch and is taken along the line 6—6 of Fig. 2.

Referring now to Figs. 2, 4 and 6, the stop motion clutch 45 comprises a disc 46 suitably secured to the forward end of shaft 90. Disc 46 has a radially extending slot 47 provided on the forward face thereof. Shaft 36 is rotatably journaled at its forward end within a bearing 48 provided in the forward face of disc 46 and has secured thereto by means of a pin 50 a sleeve 51. A latch 52 is provided in a recess 51' in sleeve 51 and is adapted to be shifted longitudinally thereof in a direction parallel to the shaft 36 so as to engage the slot 47 and thus provide a driving connection between the shaft 36 and the constantly driven shaft 90. A spring 53 in recess 51' of sleeve 51 urges the forward end of latch 52 toward the slot 47. A combination latch shifting and clutch stop lever 54 (Figs. 2 and 4) is pivotally supported for movement about a horizontal axis upon a pin 55 secured on a bracket 56. Lever 54 has a tapering upper end portion 57 which is adapted to engage a projection 58 on latch 52 and move the latch toward the left, thus disengaging the same from the slot 47. Lever 54 has a horizontally extending arm 60 (Fig. 4) which is attached to a tension spring 61 for the purpose of urging the upwardly projecting end portion 57 of lever 54 into engagement with the projection 58 of latch 52. A solenoid 62 is provided on the housing 44 and has a vertically extending plunger 63 coacting therewith. A link 64 is provided to connect the plunger 63 with the outer end of the arm 60 of lever 54.

It will be seen from the foregoing that when the solenoid 62 is actuating by means of a current passing therethrough the plunger 63 will be drawn upward causing the lever 54 to move clockwise about the pin 55, thus removing the projection 57 from engagement with the projection 58 of dog 52. Upon the removal of projection 57 from engagement with projection 58 spring 53 will be allowed to urge the forward end of dog 52 into engagement with radial slot 47 on disc 46, permitting a driving connection between the shafts 36 and 90. Latch 52 will remain in engagement with the slot 47 on disc 46 for only one revolution unless lever 54 is held in a retracted position by the solenoid 62. Considering that the solenoid 62 is not energized at the end of the revolution of sleeve 51, the tapering projection 57 of lever 54 will engage the projection 58 and, acting as a wedge, will move the dog 52 out of engagement with slot 47. A complete stop of sleeve 51 is effected by engagement of the projection 58 with a flat surface 59 formed on lever 54 at the bottom of projection 57.

Referring now to Fig. 2 the vertical shaft 8 has secured to the upper end thereof a helical gear 65 which meshes with a similar gear 66 of equal pitch diameter provided on a horizontal cross shaft 67. A bevel gear 68 on shaft 67 meshes with a similar bevel gear 69 of equal pitch diameter provided on a vertically extending shaft 70. Shaft 70 has secured thereto the driving member of a Geneva mechanism 71 to transmit intermittent rotation to a color filter wheel described hereinafter.

Figure 7:
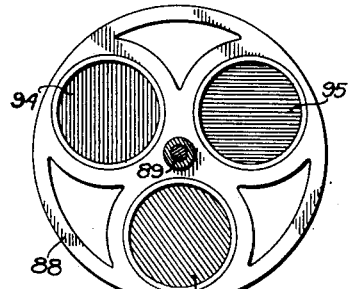
Fig. 7 is a plan view of the color filter wheel and is taken along the line 7—7 of Fig. 2.
Figure 5:
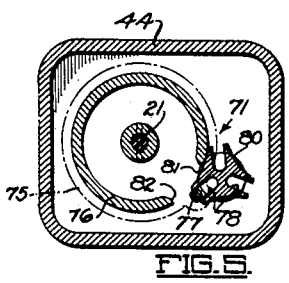
Fig. 5 is a sectional plan view taken through the intermittent color filter actuating mechanism and is taken along the line 5—5 of Fig. 2.

Referring now to Figs. 2 and 5 the Geneva mechanism 71 comprises a cam disc 75 having a depending flange 76 formed thereon. A downwardly extending pin 77, also provided on disc 75, is adapted to engage any one of three radially extending slots 78 formed in a star wheel 80 which forms the intermittently driven member of the mechanism 71. Flange 76 is adapted to slidably engage the sides 81 of star wheel 80 during periods of rest thereof and terminates an open portion 82 adjacent the pin 77 to permit rotation of star wheel 80 by the engagement of pin 77 with either of slots 78. Star wheel 80 is secured upon the upper end of a filter shaft 84, which is journaled in bearings 85 and 86 formed in the housing 44. Shaft 84 transmits rotation to a filter wheel 88, located below the objective lens 12, through a coaxial shaft section 87 and a stub shaft 89. Shaft 89, secured to the filter wheel 88, is journaled within a bracket 90 suitably secured by bolts 90' to the under-surface of camera 10. As shown in Fig. 7 filter wheel 88 has equally spaced therearound a series of three color filters 94, 95 and 96, preferably of the three primary colors, red, blue and green, respectively. These three filters are preferably formed of relatively thin gelatine or celluloid to produce a minimum deflection of light rays passing therethrough to the camera lens 12.

Wheel 88 is made as light and small in diameter as possible to reduce the effects of inertia due to the intermittent motion thereof. Accordingly I place the filter shaft as close to the side of the camera as possible. In order to permit opening the door 97, hinged to the camera body 17 at 98, for the purpose of threading the film, adjustments, etc., the shaft section 87 is made quickly removable. As shown in Fig. 2 the lower end of shaft section 87 has an enlarged head 100 secured thereto. A pair of diametrically opposed pins 101 and 102 project downwardly from head 100 and fit in cooperating recesses formed in an enlarged head 103 secured to the upper end of stub shaft 89. The upper end of shaft 87 has a square portion 104 adapted to be slidably engaged by a similarly formed opening in a sleeve 105. Sleeve 105 has a pair of upwardly extending diametrically opposed pins 106 and 107 therein which are adapted to fit in cooperating recesses in an enlarged head 108 secured to the lower end of filter shaft 84. Sleeve 105 is urged upwardly into engagement with head 108 by means of a compressing spring 110 abutting a collar 111 secured to shaft section 87. It will be noted that the pins 101 and 106 on the head 100 and sleeve 105, respectively, are of different diameters than their respective diametrically opposed pins 102 and 107, thus insuring correct coupling of filter wheel 88 in respect to the various other parts of the stop motion and color attachment. When it is desired to remove the shaft section 87 to permit opening door 97, sleeve 105 is pressed downward against the action of spring 110 until pins 106 and 107 are clear of their respective recesses in head 108, allowing removal of the section.

Referring now to Figs. 2 and 4, I will explain the means for controlling the action of the stop motion clutch 45 to permit the exposure of three successive frames of film 20 before the camera mechanism is automatically disconnected from the continuously driven shaft 90. Vertical shaft 70 has secured to the upper end thereof a helical gear 112 which meshes with a second helical gear 113 on a horizontal shaft 114. The ratio of the pitch diameters of gears 112 and 113 is such that shaft 114 is rotated one third of a revolution for each complete revolution of the shafts 21 and 36. A cam 115 having a pair of lobes 116 and 117 thereon displaced 120° from each other is secured on shaft 114.

Electrical contacts 118 and 119, in series with a solenoid circuit 120, are supported in spaced relation with each other by an insulated supporting piece 121. On engagement of either of lobes 116 or 117 with contact 119 the two contacts 118 and 119 will be brought together, thus closing the solenoid circuit 120 and allowing a suitable source of current as diagrammatically indicated at 122 to energize solenoid 62. Push button 16, supported on table 13 (Fig. 1) is shown diagrammatically as being electrically connected in parallel with the contacts 118 and 119, thus constituting a manual means for controlling actuation of solenoid 62. A counting mechanism 123 is also attached to shaft 114 to record the number of series of exposures made, or in other words, to record every third frame of film 20.

Fig. 3 illustrates a section of cinematographic film 20' as photographed in camera 10 whereon the first frame 124 has been photographed through the red filter 94; the second frame 125, through the blue filter 95; and the third frame 126 through the green filter 96. It is to be noted that all three frames 124, 125 and 126, although exposed through differently colored filters, have recorded thereon the same phase of movement of the scene photographed. The next succeeding frames 127, 128 and 129 have also been successively exposed through the same filters and in the same order. However, these frames have recorded thereon the next successive phase of movement of the scene photographed.

In the operation of the apparatus, the drawing 14 to be photographed is placed in correct alignment upon the table 13 and the push button 16 is pressed and quickly released, thus closing the solenoid circuit 120 (Fig. 4). Energization of solenoid 62 by pressing button 16 causes the projection 57 of lever 54 to be retracted, permitting the clutch 45 to be engaged, thus operating the various camera mechanisms. On opening the solenoid circuit 120 by releasing the push button 16 the lever 45 will be moved by spring 61 to ride upon the surface of sleeve 51. Toward the end of one revolution of clutch 45, corresponding to one-third of a revolution of cam 115, the lobe 116 on cam 115 will engage the contact 119, thus again closing the solenoid circuit to permit the rotation of clutch 45 through a second revolution. On completion of the second revolution of clutch 45, corresponding to the second exposure in camera 10, the second lobe 117 will come into engagement with the contact 119, thus again closing the solenoid circuit to permit rotation of clutch 45 through a third revolution. At the end of the third revolution, however, the absence of a lobe on cam 115 to close the solenoid circuit 120 (the position of the apparatus at this point being indicated in Fig. 4) permits the projection 57 on lever 54 to disengage clutch 45 and automatically stop the photographic operation of the camera until the push button 16 is again operated to energize the solenoid circuit 120, in which event the foregoing cycle of operation is repeated.

The apparatus may be changed, if desired, to obtain ordinary non-color animated cartoon pictures merely by removing the color filter wheel 88 and electrically disconnecting either of contacts 118 and 119 from the circuit 120. With such changes, operation of push button 16 will cause a single rotation only of clutch 45, or in other words, a single exposure of film 20 in camera 10 for each cartoon drawing.

In the event that it is desired to operate camera 10 in the ordinary non-color cinematographic manner the entire color and stop motion attachment may be removed by removing bolts 90' and 130 and suitably attaching a camera motor, similar to that of 92, to the camera casing 17 in driving connection with the camera shaft 21.

Although the invention is particularly adaptable to the production of colored animated cartoons it is to be understood that it may also be applied to other types of color photography, nor is the invention limited to the particular construction above described and illustrated.

Having thus described the invention, what is claimed as new and desired to be secured by Letters Patent, is:

1. In an apparatus for producing colored motion pictures, a cinematographic camera, an intermittent film feeding mechanism for said camera, a rotatable filter shaft, a plurality of filters of different color absorption characteristics carried by said shaft, means for operating said camera, clutch means between said operating means and said camera, means for automatically disengaging said clutch means after a number of exposures on successive frames of a film in said camera equal to the number of said filters has been made, and means operatively connected between said filter shaft and said film feeding mechanism for rotating said filter shaft step-by-step whereby said filters are successively positioned stationary across the optical axis of said camera during the corresponding successive exposure periods of said camera.

2. In an apparatus for producing colored motion pictures, a cinematographic camera, a continuously rotatable shaft, a clutch operatively connected to said camera and adapted to be driven by said shaft, means operatively connected to said clutch to disengage the same after a predetermined number of revolutions, a plurality of light filters of different color absorption characteristics, and an operative connection between said filters and said clutch whereby said filters are successively positioned stationary in the optical axis of said camera in timed relation with the corresponding successive exposure periods of said camera, said last mentioned connection including a member driven by said clutch and a second member operatively connected to said filters and adapted to be intermittently rotated by said first member.

3. Photographic apparatus comprising a cinematographic camera, an intermittent film feeding mechanism in said camera, a continuously rotatable drive shaft, a clutch adapted to operatively connect said shaft and said film feeding mechanism, means operatively connected to said clutch for automatically disengaging the same after a predetermined number of exposures of the film in said camera, manually operable means for engaging said clutch, a filter shaft, a plurality of filters equal in number to said predetermined number of exposures carried by said shaft and adapted to be successively passed across the optical axis of said camera, and a Geneva mechanism operatively connected between said filter shaft and said clutch, said Geneva mechanism comprising a cam disk operatively connected to said clutch and a star wheel engaging said cam disk and operatively connected to said filter shaft whereby said filters are intermittently positioned stationary across said optical axis.

4. Photographic apparatus in accordance with claim 3 wherein said automatically disengaging means comprises means for automatically disengaging said clutch after each revolution thereof, electro-magnetic means for engaging said clutch, a pair of contacts in the circuit of said electro-magnetic means and normally opening said circuit, and a rotatable cam operatively connected to said clutch and adapted to close said contacts at the beginning of each of a number of revolutions equal to one less than said predetermined number of exposures.

5. In an attachment for a cinematographic camera, the combination of a base, a filter carrier, means for rotatably supporting said carrier on said base, a plurality of filters of different color absorption characteristics on said carrier, means on said base for automatically and intermittently rotating said carrier to position said filters successively stationary in a predetermined position, and means for attaching said base on the outside of the end wall of a motion picture machine.

6. In an attachment for a cinematographic camera, the combination of a base, a filter carrier, means for rotatably supporting said carrier on said base, a motor on said base, a drive shaft on said base adapted to be continuously rotated by said motor, means on said base operatively connected to said drive shaft for intermittently rotating said carrier, and means for attaching said base outside of and on one of the walls of a motion picture machine.

7. A color attachment for cinematographic cameras comprising the combination of a rotatable filter shaft, a plurality of filters of different color absorption characteristics carried by said shaft, continuously operable means for rotating said filter shaft, clutch means connecting said filter shaft and said continuously operable means, means operatively connected to said clutch means for automatically disengaging said clutch means after a predetermined number of revolutions thereof, and means operatively connected between said filter shaft and said clutch for intermittently rotating said filter shaft step by step whereby said filters are successively positioned stationary in a predetermined position.

8. In apparatus of the class described, a continuously rotatable shaft, a plurality of light filters of different color absorption characteristics, a clutch operatively connected between said shaft and said filters, means operatively connected between said clutch and said filters for successively positioning said filters stationary in a predetermined position, manually operable means for engaging said clutch and means for automatically disengaging said shaft after a series of revolutions thereof equal in number to the number of said filters, said last mentioned means comprising means for automatically disengaging said clutch after each revolution thereof, means for engaging said clutch, cam means operatively connected between said clutch and said last mentioned means for engaging said clutch at the end of each of a number of revolutions of said clutch equal to one less than the number of said filters.

9. Photographic apparatus comprising a cinematographic camera, film feeding mechanism in said camera, a door on said camera to permit access to said mechanism, a filter shaft, a plurality of color filters carried by said shaft and adapted to be successively positioned across the optical axis of said camera, means for supporting said shaft closely adjacent said optical axis and in the path of said door, and coupling means for removing a portion of said shaft to permit opening said door.

10. Photographic apparatus for producing colored motion pictures comprising a cinematographic camera, film feeding mechanism in said camera, a door on said camera to permit access to said mechanism, a plurality of color filters, a filter shaft adapted to successively position said filters across the optical axis of said camera, means for rotatably supporting said shaft closely adjacent said optical axis and in the path of said door closely adjacent to said door, and a pair of couplings on said shaft adjacent either end of said door whereby a section of said shaft may be quickly removed to permit opening said door.

11. A photographic apparatus in accordance with claim 10 wherein means are provided on each of said couplings to permit coupling said shaft section in one angular position only relatively to the remainder of said shaft.

12. An attachment for a standard cinematographic camera comprising a housing, means adapted to support said housing in fixed relation with the camera, a motor carried by said housing, a drive shaft rotatably supported by said housing, means on said shaft adapted to couple said shaft with a camera shaft in said camera, an operative connection between said motor and said drive shaft, a filter shaft rotatably supported by said housing, an operative connection between said motor and said filter shaft, means adapted to support said filter shaft across the path of movement of a door in said camera, and a removable section on said filter shaft adapted on removal thereof to permit opening said door.

13. An attachment for a standard cinematographic camera comprising a housing, means adapted to secure said housing outside an end wall of the camera, a motor carried by said housing, a drive shaft rotatably supported by said housing, an operative connection between said motor and said shaft, removable coupling means adapted to couple said shaft to a camera drive shaft in said camera, a filter shaft rotatably supported by said housing, and an operative connection between said motor and said filter shaft.

14. A color attachment for a standard cinematographic camera comprising a housing, means adapted to secure said housing to the camera, a motor carried by said housing, a drive shaft rotatably supported by said housing, removable coupling means adapted to couple said shaft to a camera drive shaft in said camera, a clutch operatively connected between said motor and said first mentioned shaft, means for automatically disengaging said clutch after a predetermined number of revolutions thereof, manually operable means for engaging said clutch, a filter shaft rotatably supported by said housing, and an operative connection between the disengageable portion of said clutch and said filter shaft, said last mentioned operative connection comprising an intermittent mechanism adapted to successively rotate said filter shaft.

15. Photographic apparatus comprising a housing having a base, means for attaching said base on the outside of the end wall of a motion picture machine, a pair of parallel rotatable shafts carried by said housing and extending at right angles to the plane of said base, said shafts each having a coupling adjacent said base, a power shaft on said base, a clutch adapted to connect said power shaft to one of said pair of shafts, and means comprising a Geneva mechanism for driving the other of said pair of shafts from said one of said pair of shafts.

16. Photographic apparatus comprising a base, means for attaching said base on the outside of the end wall of a motion picture machine, a filter shaft, means for supporting said shaft on the outside of the machine with its axis closely adjacent the optical axis of the machine, a bearing at the front wall of the machine for said shaft, an aligned bearing on said base for said shaft, a motor on said base for said shaft, and couplings for said shaft between said bearings.

ALBERT W. TONDREAU.